(12) United States Patent
Nakamura et al.

(10) Patent No.: US 6,696,996 B1
(45) Date of Patent: Feb. 24, 2004

(54) METHOD AND APPARATUS TO ELIMINATE AUDIBLE CLICKING TRANSIENTS WHEN SWITCHING AUDIO STREAMS

(75) Inventors: Michael D. Nakamura, Portland, OR (US); John C. Reynolds, Beaverton, OR (US)

(73) Assignee: Omneon Video Networks, Sunnyvale, CA (US)

( * ) Notice: Subject to any disclaimer, the term of this patent is extended or adjusted under 35 U.S.C. 154(b) by 0 days.

(21) Appl. No.: 09/544,947

(22) Filed: Apr. 7, 2000

(51) Int. Cl.[7] ................................................ H03M 9/00
(52) U.S. Cl. ....................... 341/101; 341/141; 704/503
(58) Field of Search ............................ 341/101, 141; 370/535, 537; 704/503, 504; 700/94

(56) References Cited

U.S. PATENT DOCUMENTS

| | | | | |
|---|---|---|---|---|
| 5,425,061 A | * | 6/1995 | Laczko et al. | 375/371 |
| 5,801,782 A | * | 9/1998 | Patterson | 348/473 |
| 6,018,369 A | * | 1/2000 | Patterson | 348/461 |
| 6,356,872 B1 | * | 3/2002 | Leung et al. | 704/503 |
| 6,618,740 B1 | * | 9/2003 | Staszewski | 708/322 |

* cited by examiner

*Primary Examiner*—Brian Young
*Assistant Examiner*—John Nguyen
(74) *Attorney, Agent, or Firm*—Blakely, Sokoloff, Taylor & Zafman LLP

(57) ABSTRACT

A method and apparatus to switch between two audio streams without creating a clicking transient. A first serial audio stream is brought into a serial shift register. A series of samples of that audio stream are multiplied by reducing coefficients until a contribution of the first audio stream reaches zero. Then, a second serial audio stream is brought into the serial shift register. Increasing coefficients are applied to a series of samples until a contribution of the second audio stream is one.

13 Claims, 5 Drawing Sheets

METHOD AND APPARATUS TO ELIMINATE AUDIBLE CLICKING TRANSIENTS WHEN SWITCHING AUDIO STREAMS

BACKGROUND (1) Field of the Invention

The invention relates to switching between audio streams. More specifically, the invention relates to a method and apparatus for avoiding a transient click in switching between two serial audio streams.

(2) Background

Switching between audio streams, there is often a problem with a clicking transient when significant differences exist between two adjacent samples in the different streams. Thus, techniques for shaping and blending the audio streams have been developed. Typically, in the context of two serial audio streams, samples from both audio streams are brought in and deserialized. The deserialized sample of the first audio stream is multiplied by a constant, and the deserialized sample from the second audio stream is multiplied by one minus the constant. The resulting products are added together, reserialized, and that becomes the output audio signal. FIG. 1 is a block diagram of one prior art solution. A first and second audio stream each enters a deserializer 110. A deserialized audio sample is multiplied in multiplier 112 by a constant K for the first audio stream, and a deserialized sample from the second audio stream is multiplied in multiplier 114 by 1–K. The resulting product samples are summed in adder 116 and generate a parallel audio output signal. The parallel audio output signal is then serialized by the serializer to generate a serial audio output stream. In this example, the constant K varies between zero and one. Audio declicking in this manner requires a large number of registers for the deserialization and reserialization of the two input streams. Thus, this implementation is problematic in area-constrained applications.

BRIEF SUMMARY OF THE INVENTION

A method and apparatus to switch between two audio streams without creating a clicking transient is disclosed. A first serial audio stream is brought into a serial shift register. A series of samples of that audio stream are multiplied by reducing coefficients until a contribution of the first audio stream reaches zero. Then, a second serial audio stream is brought into the serial shift register. Increasing coefficients are applied to a series of samples until a contribution of the second audio stream is one.

DETAILED DESCRIPTION

Figure 1:
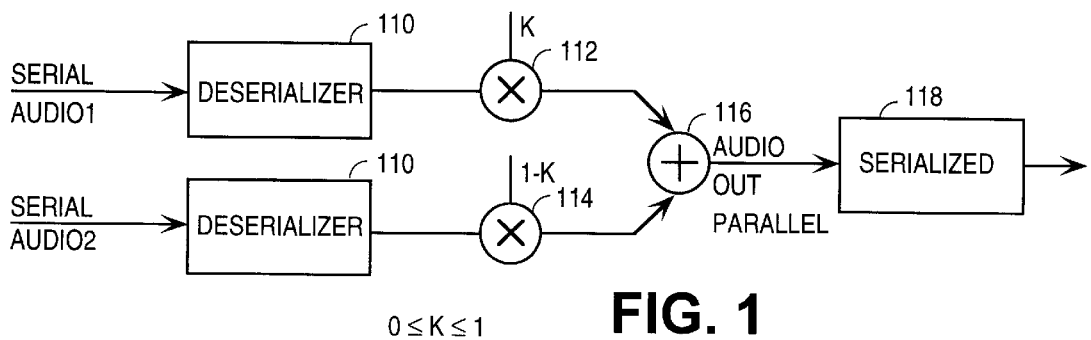
FIG. 1 is a block diagram of one prior art solution.
Figure 2:
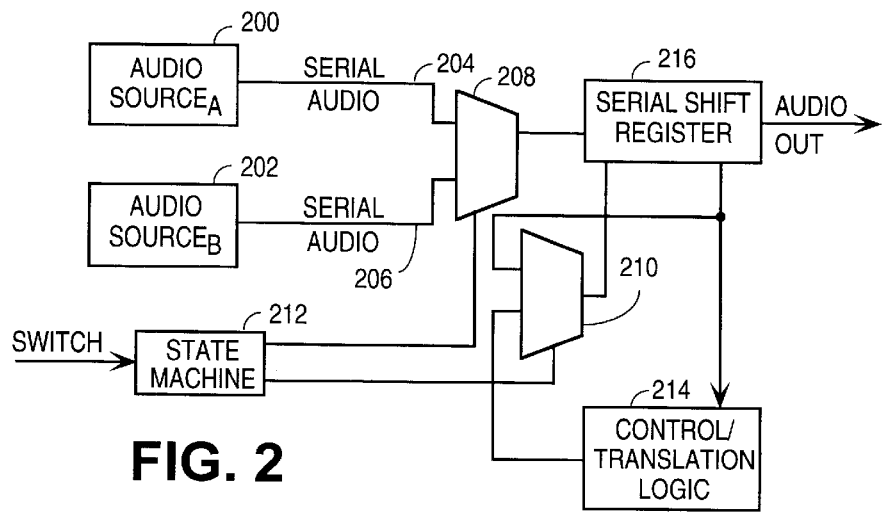
FIG. 2 is a block diagram of a system of one embodiment of the invention.

FIG. 2 is a block diagram of a system of one embodiment of the invention. A first audio source 200 provides a serial audio stream 204 to a multiplexer 208. A second audio source 202 provides a second serial audio stream 206 to a multiplexer 208. The multiplexer select signal is controlled by a state machine 212 to determine which of the first audio stream and the second audio stream is permitted to pass through the multiplexer 208. The output of the multiplexer 208 provides input to a serial shift register 216 which is comprised of a plurality of individual latches, the output of which serve as inputs to a series of multiplexers represented as multiplexer 210 in this figure. The second input of multiplexer 210 comes from control translation logic 214, and the select signal for multiplexer 210 comes from state machine 212. Basically, when a switch in the audio stream is desired, a sample from the first audio stream is loaded through the shift register. A state machine then deselects the proceeding latch output at multiplexer 210 and permits a shifted sample (corresponding to a sample multiplied by a constant) generated by control and translation logic 214 to replace the existing sample in the register and then propagate through to the output. Because there is no need to deserialize the audio samples and only a single stream contributes to the output at any time, the number of registers required is significantly reduced. This implementation is suitable for area constrained applications. The switching device (everything shown in FIG. 2 except the audio sources) can be implemented in a single field programmable gate array (FPGA).

Figure 3:
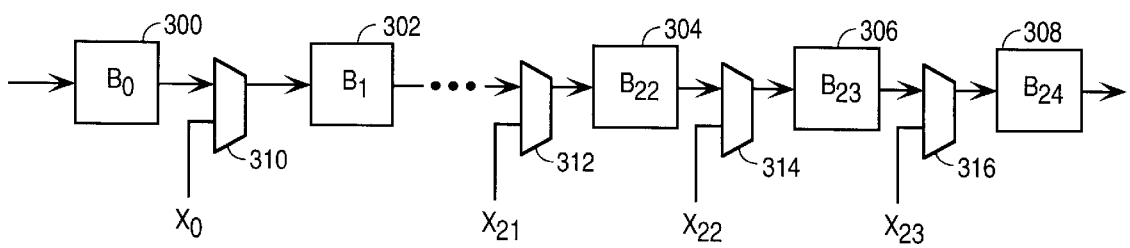
FIG. 3 is a block diagram showing greater detail of a shift register multiplexer arrangement of one embodiment of the invention.

FIG. 3 is a block diagram showing greater detail of a shift register multiplexer arrangement of one embodiment of the invention. Assuming a 24-bit sample size, the shift register will typically be composed of a number of latches greater than the number of bits, so, in this example, twenty five latches. Latch $B_0$ is coupled to receive bits from the incoming audio stream. On subsequent clock pulses, the bit received at $B_0$ will propagate to latch $B_1$, 302 and so forth, until it reaches $B_{22}$ 304 and finally, $B_{23}$ 306. Once a full sample is in latches $B_0$ through $B_{23}$ if no switch signal is asserted, the sample propagates out through latch $B_{24}$ 308 and into the output audio stream in the normal manner. If a switch signal is asserted, then multiplexers 310, 312, 314, and 316, rather than selecting the output of the preceding latch, select alternative inputs $X_0$ . . . $X_{21}$, $X_{22}$, and $X_{23}$ (which come from control and translation logic 214 of FIG. 2). Thus, when a switch signal is asserted while latch $B_0$ 300 receives the first bit of a next sample, latches $B_1$, through $B_{24}$ receive a shifted sample corresponding to the sample previously in $B_0$ through $B_{23}$ multiplied by a coefficient. Table 1 shows one example translation which might be produced.

TABLE 1

| Coeff. | X23 | X22 | X21 | X20 | X3 | X2 | X1 | X0 |
|---|---|---|---|---|---|---|---|---|
| 1.00 | B23 | B22 | B21 | B20 | B3 | B2 | B1 | B0 |
| 0.50 | B23 | B23 | B22 | B21 | B4 | B3 | B2 | B1 |
| 0.25 | B23 | B23 | B23 | B22 | B5 | B4 | B3 | B2 |
| 0.75 | B23 | B23 | B22 | B21 | B4 | B3 | B2 | B1 |
|  | + | + | + | + | + | + | + | + |
|  | B23 | B23 | B23 | B22 | B5 | B4 | B3 | B2 |

It has been found that transition to zero for the first audio stream contribution over four samples and then back to one for the second audio stream contribution over four samples avoid audible clicking transients. By selecting coefficients of 1, 0.75, 0.5, 0.25 and 0, replacement samples are easily generated from the base sample. The 1 and 0 cases are trivial. The 0.5 and 0.25 cases represent one and two right shifts with a carry in equal to the most significant bit. The 0.75 case is easily generated as the sum of the 0.5 and 0.25 cases. While these coefficients are suitable, other coefficients and transitions over more or fewer samples are within the scope and contemplation of the invention.

Figure 4:
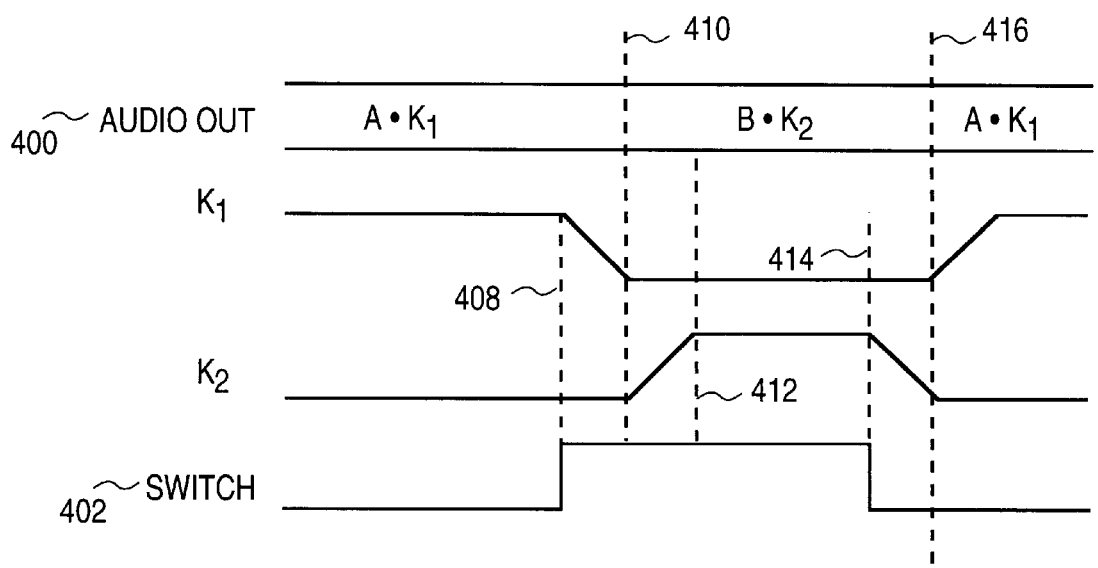
FIG. 4 is a timing diagram of a switch in one embodiment of the invention.

FIG. 4 is a timing diagram of a switch in one embodiment of the invention. The audio out signal is initially equal to $A \times K_1$, where A is a sample value of a first audio stream and $K_1$ is a constant. Until time 408 when a switch signal 402 is asserted, $K_1$ is equal to 1. At time 408, $K_1$ begins to be reduced algorithmically until it reaches zero at time 410. From time 410, the audio out signal 400 becomes equal to $B \times K_2$, where $K_2$ is a constant and B is the sample value of a second audio stream. $K_2$ slopes from zero at time 410 until it reaches one at time 412. In one embodiment of the invention, $K_1$ goes to zero in four samples and $K_2$ gets to one in four samples. When the switch signal 402 is again asserted at time 414, $K_2$ regresses back to zero at time 416, at which point $K_1$ begins to climb back to one, and the output audio signal 400 is again $A \times K_1$. Notably, at no time is there a contribution from both the first and second audio stream to the output signal. Initially, the audio out is equal to the first audio stream. The contribution from that audio stream is diminished to zero between times 408 and 410. Subsequent contribution to the audio stream out by the second audio stream is increased until the full value of the second audio stream is equal to the value of the audio stream out. In this manner, it has been found that clicking transients typically caused by switching between audio streams can be avoided.

Figure 5A:
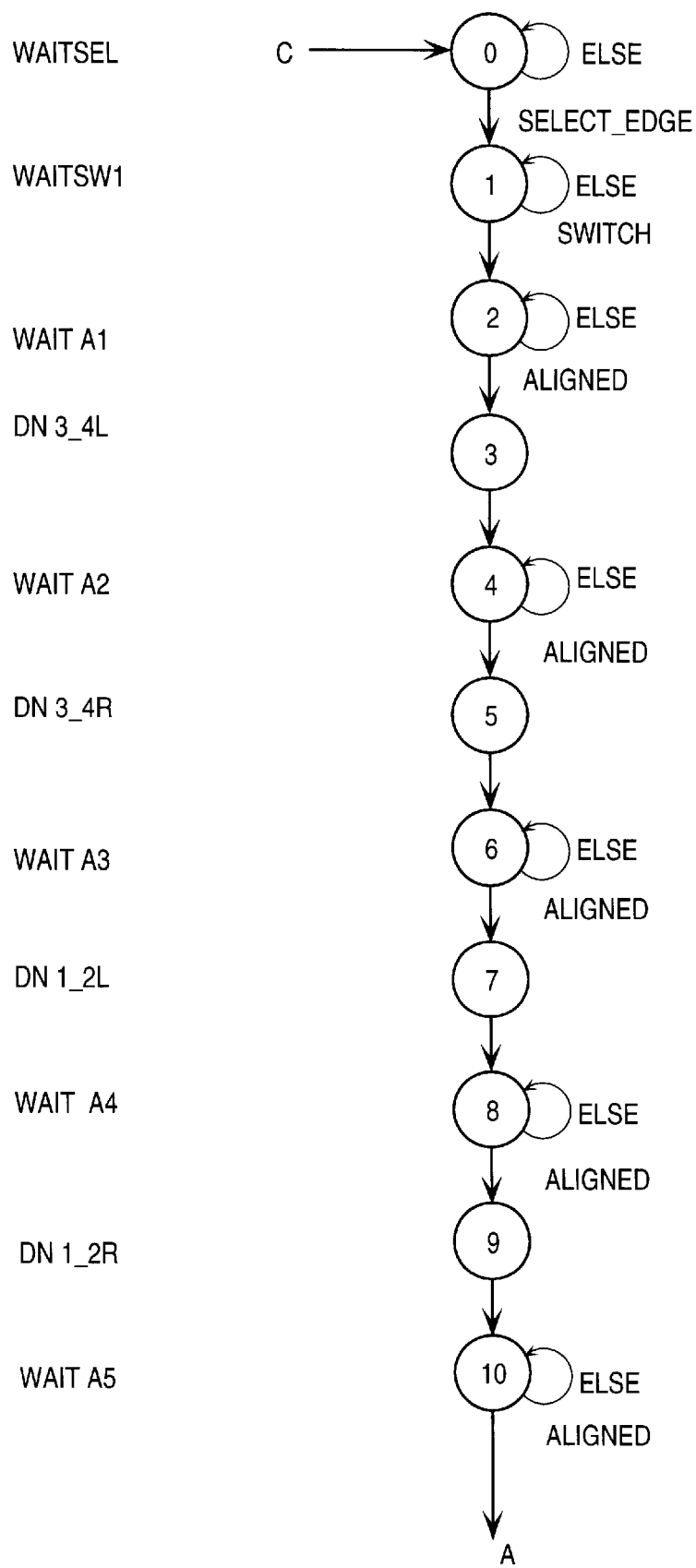
FIGS. 5a–c show a state diagram of one embodiment of the invention.
Figure 5B:
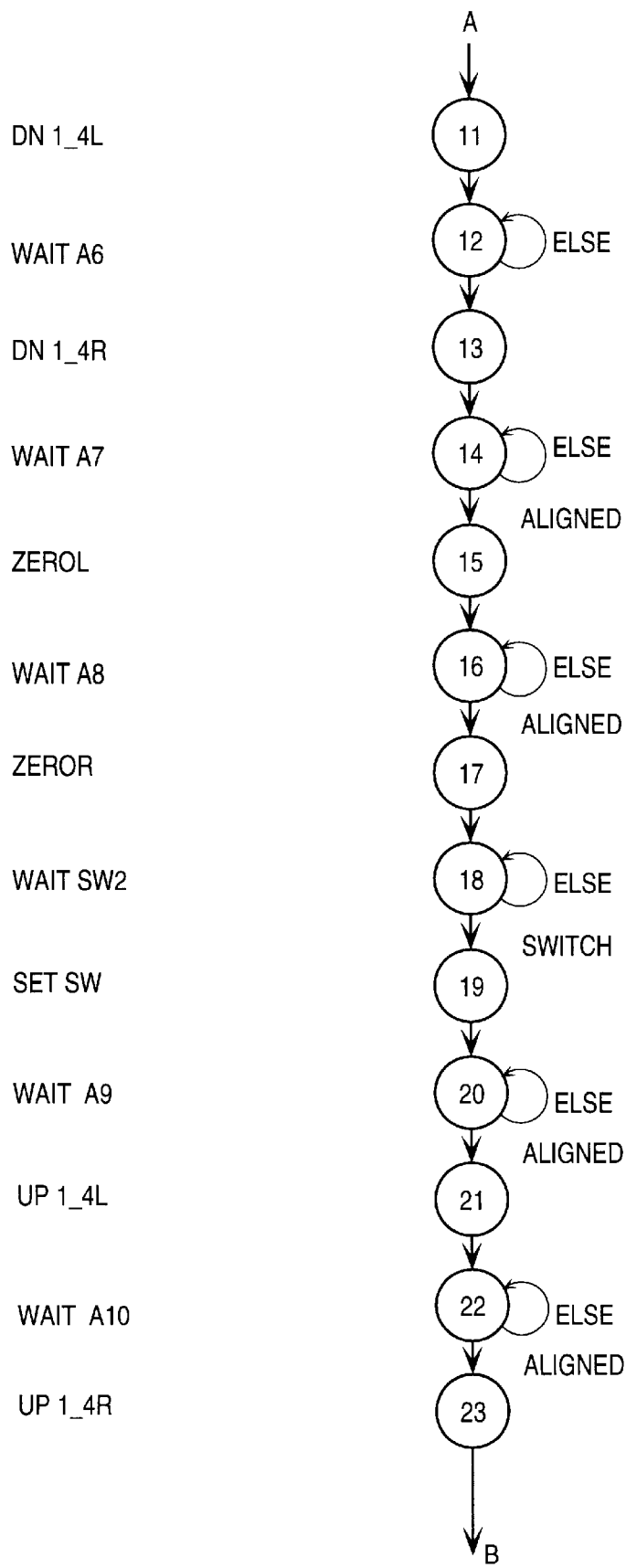
Figure 5C:
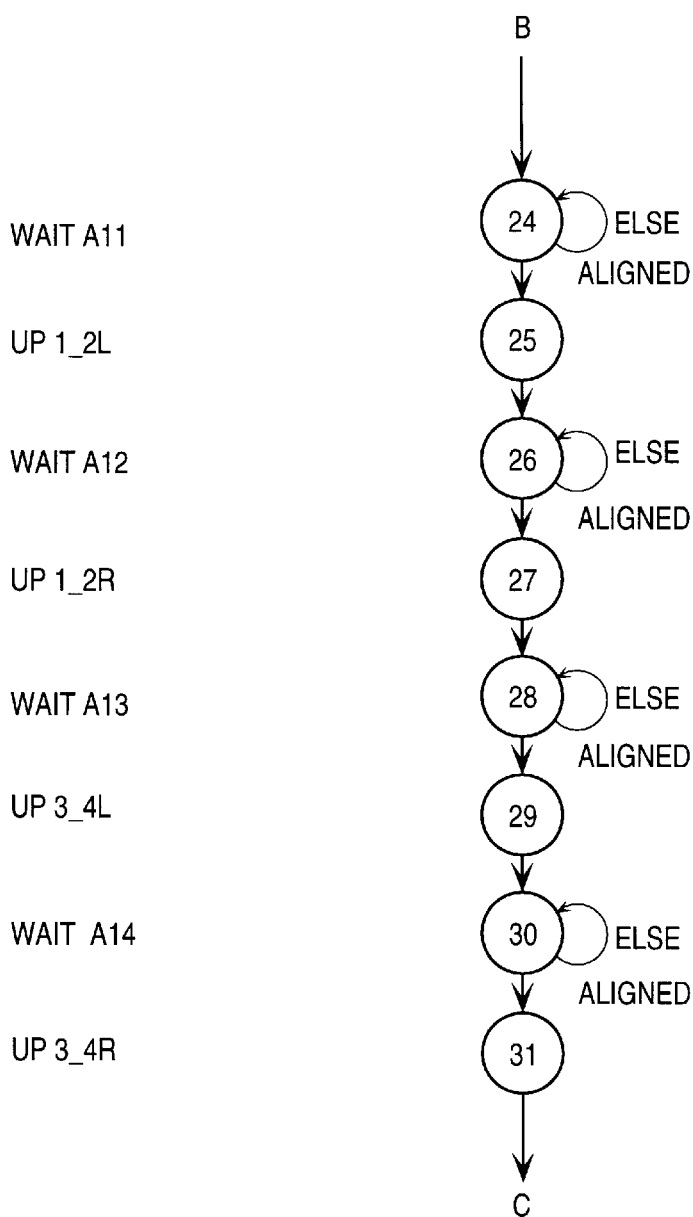

FIGS. 5a–c show a state diagram of one embodiment of the invention. While the state machine is in state 0, a current audio stream (for this discussion, first audio stream) is permitted to forward samples through the shift register in a continuous stream. Upon assertion of a select edge signal, the state machine transitions to state 1. The state machine remains in state one continuing to forward the current audio stream through the shift register until a switch signal is received. Once the switch signal is received, the state machine transitions to state 2 in which it remains until a sample is detected as being aligned within the shift register. Once an aligned sample is within the shift register, the state machine transitions to state 3. As the state machine transitions out of state 3, the sample corresponding to the previously aligned sample multiplied by 0.75 is inserted into the shift register in place of the corresponding sample.

In the shown embodiment, it is assumed that the audio stream comprises a right and left channel. It is desirable to apply the same coefficient to both samples of a right and left channel sample pair. Thus, at state 4, the second sample of a sample pair (in this case, the right channel sample) is loaded into the shift register. When that sample is detected as being aligned, the state machine transitions to state 5 in which a coefficient of 0.75 is applied to the right sample and the shifted sample replaces the pre-existing sample moving through the shift register. While the state machine is in state 6, a next left sample is loaded into the shift register. When it is detected as being fully within the shift register, the aligned signal causes the transition to state 7 in which a 0.50 coefficient is applied to the sample. At state 8, the right sample of the sample pair is loaded into the register. Once aligned, the coefficient of 0.50 is applied to the sample at state 9. At state 10, a next (third) left sample is loaded into the shift register. Once aligned, a 0.25 coefficient is applied at state 11. The next (third) right sample is loaded at state 12 with a 0.25 coefficient applied at state 13. The next (fourth) left sample is loaded at state 14 and zeroed at state 15. Analogously, a right sample is loaded at state 16 and zeroed at state 17.

At state 18, the state machine waits for a switch signal. When a switch signal is received, the state machine transitions into state 19. This causes the select signal to select a second audio stream through the multiplexer as shown in FIG. 2. The second audio sample begins filling the shift register at state 20. Once the first left sample of the second audio stream is aligned, a coefficient of 0.25 is applied at state 21. State 22 and 23 are analogous for the first right sample. The next (second) left sample is loaded at state 24. Once aligned, a 0.50 coefficient is applied to state 25. State 26 and 27 correspond to analogous activity for the right channel sample. States 28 through 31 are similarly analogous applying a 0.75 coefficient to a left and right channel sample. After that, the state machine begins again at state 0 with the full value of the second audio stream passing through the shift register to the output stream.

While the foregoing state machine described in the context of a two-channel audio stream is within the scope and contemplation of the invention to have a single channel audio stream or a multiple channel audio stream, an appropriate analogous state machine can be easily constructed.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
   a serial shift register to receive a serial audio stream, the shift register including a number of latches greater than a number of bits in one sample of the serial audio stream;
   logic to generate a shifted sample corresponding to a current sample multiplied by a predetermined coefficient; and
   a state machine coupled to the serial shift register to determine which of the shifted sample and an output of each immediately preceding latch is applied to the number of latches.

2. The apparatus of claim 1 wherein the logic comprises an alignment identifier to notify the state machine when a sample is aligned within the shift register.

3. The apparatus of claim 1 further comprising:
   a plurality of multiplexers coupled to the number of latches to select between the shifted sample and the output of the immediately preceding latch.

4. The apparatus of claim 1 wherein the logic to generate a shifted sample comprises:
   a shifter, and
   an adder.

5. The apparatus of claim 1 wherein the shifted sample shifted equal to one of 0.75, 0.5, and 0.25 times a current sample.

6. A method comprising:
   shifting a first sample from a first audio stream into a first plurality of latches that comprise a portion of a serial shift register;
   substituting a first shifted sample corresponding to the first sample multiplied by a first predetermined coefficient on a next shift after the first sample is in the first plurality of latches;

shifting a fifth sample from a second audio stream into the first plurality of latches; and substituting a fifth shifted sample corresponding to the fifth sample multiplied by a second predetermined coefficient on a next shift after the second sample is in the first plurality of latches.

7. The method of claim 6 further comprising:

successively shifting in a second, a third, and a fourth sample from the first audio stream; and substituting corresponding shifted samples for each of the second, the third, and the fourth samples from the first audio stream.

8. The method of claim 7 wherein the coefficient applied to generate the first, the second, the third and the fourth shifted samples of the first audio stream are 0.75, 0.5, 0.25 and 0.

9. The method of claim 7 further comprising:

generating the first shifted sample by summing a sample multiplied by a 0.5 coefficient and a sample multiplied by a 0.25 coefficient.

10. The method of claim 6 further comprising:

successively shifting in a sixth, a seventh, and an eight sample from the second audio stream; and substituting corresponding shifted samples for each of the sixth, the seventh, and the eight samples from the second audio stream.

11. The method of claim 10 wherein the coefficients applied to generate the fifth, sixth, seventh, and eighth shifted sample are 0.25, 0.5, 0.75 and 1.

12. A method of performing a switch between two audio streams comprising:

receiving samples of a first audio stream;

reducing a contribution of the first audio stream to an output audio stream to zero over a plurality of samples;

receiving samples of a second audio stream; and increasing a contribution of the second audio stream from zero to one over a plurality of samples after the contribution of the first audio stream has been reduced to zero.

13. The method of claim 12 wherein the samples are received in serial format further comprising:

maintaining the serial format throughout the switch.

* * * * *